(12) United States Patent  (10) Patent No.: US 6,456,799 B2
Enderby  (45) Date of Patent: Sep. 24, 2002

(54) COMBINATION CAMERA

(75) Inventor: Christine L. Enderby, Chelsea, MA (US)

(73) Assignee: Polaroid Corporation, Cambridge, MA (US)

( * ) Notice: Subject to any disclaimer, the term of this patent is extended or adjusted under 35 U.S.C. 154(b) by 0 days.

(21) Appl. No.: 09/771,767

(22) Filed: Jan. 29, 2001

Related U.S. Application Data
(60) Provisional application No. 60/179,231, filed on Jan. 31, 2000.

(51) Int. Cl.[7] .................. G03B 17/50; G03B 15/00; G03B 29/00; G03B 19/06; H04N 9/47
(52) U.S. Cl. .................. 396/323; 396/30; 396/429; 396/446; 396/351; 348/64
(58) Field of Search .................. 396/30, 322, 323, 396/429, 446, 351; 348/64

(56) References Cited

U.S. PATENT DOCUMENTS 4,488,794 A    12/1984  Dolgow et al. ............. 396/333
D289,869 S  *  5/1987  Woolley ..................... D14/171
4,949,117 A    8/1990  Van Heyningen et al. .. 396/100
5,774,750 A    6/1998  Honda ........................ 396/159
5,802,413 A  *  9/1998  Stephenson ................. 396/429
5,838,999 A    11/1998 Norris ......................... 396/33
5,940,121 A    8/1999  McIntyre et al. ............. 348/64
5,950,031 A    9/1999  Yamagata .................... 396/429
6,014,165 A    1/2000  McIntyre et al. ............. 384/64
6,104,885 A    8/2000  McIntyre et al. ........... 396/319
6,272,290 B1 *  8/2001  Mogamiya ................... 396/59

FOREIGN PATENT DOCUMENTS

JP   11-174581 A   7/1999   ........... G03B/19/06

* cited by examiner

Primary Examiner—David M. Gray
Assistant Examiner—Rochelle Blackman

(57) ABSTRACT

The present invention is an imaging apparatus which includes a housing that encloses, in a common cavity thereof, an arrangement comprising a pair of independent cameras constructed in combination with each other, said pair of cameras being a digital camera and a photosensitive film camera.

8 Claims, 4 Drawing Sheets

COMBINATION CAMERA

CROSS REFERENCE TO RELATED PATENT APPLICATIONS

This application claims the benefit of Provisional U.S. patent application Ser. No. 60/179,231, filed Jan. 31, 2000. The present invention is also related to copending U.S. Design patent application Ser. No. 29/117,978 filed on Jan. 31, 2000.

BACKGROUND

The present invention relates to an improved imaging apparatus that comprises a pair of independent cameras constructed in combination with each other.

Heretofore, it is known to provide multiple cameras, each one having characteristics different from the other for enabling a photographer to use each for a different purpose. One kind of dual camera arrangement is described in U.S. Pat. No. 4,488,794, wherein two cameras are mounted one on top of the other with the lower camera carrying instant or self-developing film and the upper camera carrying conventional film. This dual camera arrangement is intended to be used simultaneously in capturing a common scene image and has the optical axis of both cameras facing the scene. Another known dual camera system, such as described in Japanese Patent publication No. JP 11174581-A also uses different film systems for each dual camera and allows the user to operate each camera independently and/or simultaneously following manipulation of a switching arrangement. However, there exists the possibility that the user might not effect the correct switching choices.

While dual cameras of the foregoing type are acceptable, it is, nevertheless, desirable to enable a user to easily and conveniently use different ones of the dual cameras by merely reorienting the dual camera to a different spatial orientation while being held by an operator. It is also desirable to enable inexperienced photographers, such as teenagers, not having to manipulate sophisticated controls to operate the intended camera of a dual camera construction.

SUMMARY

In accordance with the present invention, there is provided, in one illustrated embodiment, an imaging apparatus comprising a photographic camera having a housing assembly that is constructed and oriented with respect to a housing assembly of an electronic camera enabling a photographer to easily grasp and reorient the imaging apparatus in different directions so as to use either the instant camera or the electronic camera.

In accordance with the present invention, there is provided, in one illustrated embodiment, an imaging apparatus comprising a photographic camera having a housing assembly that is constructed and oriented with respect to a housing assembly an electronic camera so to enable a photographer to select one or the other camera without the resort manipulating controls.

In one illustrated embodiment, the photographic camera housing is oriented so that an optical axis of its lens taking system is generally orthogonal to an optical axis of an electronic camera's taking system, whereby only one taking lens system is useful for purposes of capturing an image of a scene. In such illustrated embodiment, each housing has its own exposure control initiation button and flash system.

In one illustrated embodiment, the photographic and electronic camera systems only share a common battery source.

In another illustrated embodiment, the surfaces of the housings of both the photographic and electronic camera systems are visually differentiated in order to allow the photographer to identify which one of the cameras he/she wants to use by merely observing the housing. In this regard, the visual differentiation can be effected by different surface treatments, such as indicia, painting and surface texturing.

Among the objects and features of the present invention are, therefore, the provision of an improved imaging apparatus for allowing the photographer to readily identify and thus utilize each one of the at least a pair of camera systems independently; the provision of an improved imaging apparatus for allowing the photographer to readily identify and thus utilize each one of either an electronic or conventional camera system without making reference to controls and/or effecting operation of controls to switch between the dual systems; the provision of an improved imaging apparatus, whereby the surface characteristics and orientation thereof with respect to each other allow the camera user to readily distinguish between and use either one of the electronic and photographic cameras without utilizing the other; the provision of an improved imaging apparatus that is constructed to facilitate an operator readily appreciating which camera to use under different circumstances; and, the provision of an improved imaging apparatus of the foregoing types which are compact and low-cost.

Other objects and further scope of applicability of the present invention will become apparent when taken in conjunction with the accompanying drawings wherein as reference numerals indicate like structure throughout the several views.

DETAILED DESCRIPTION

Figure 1:
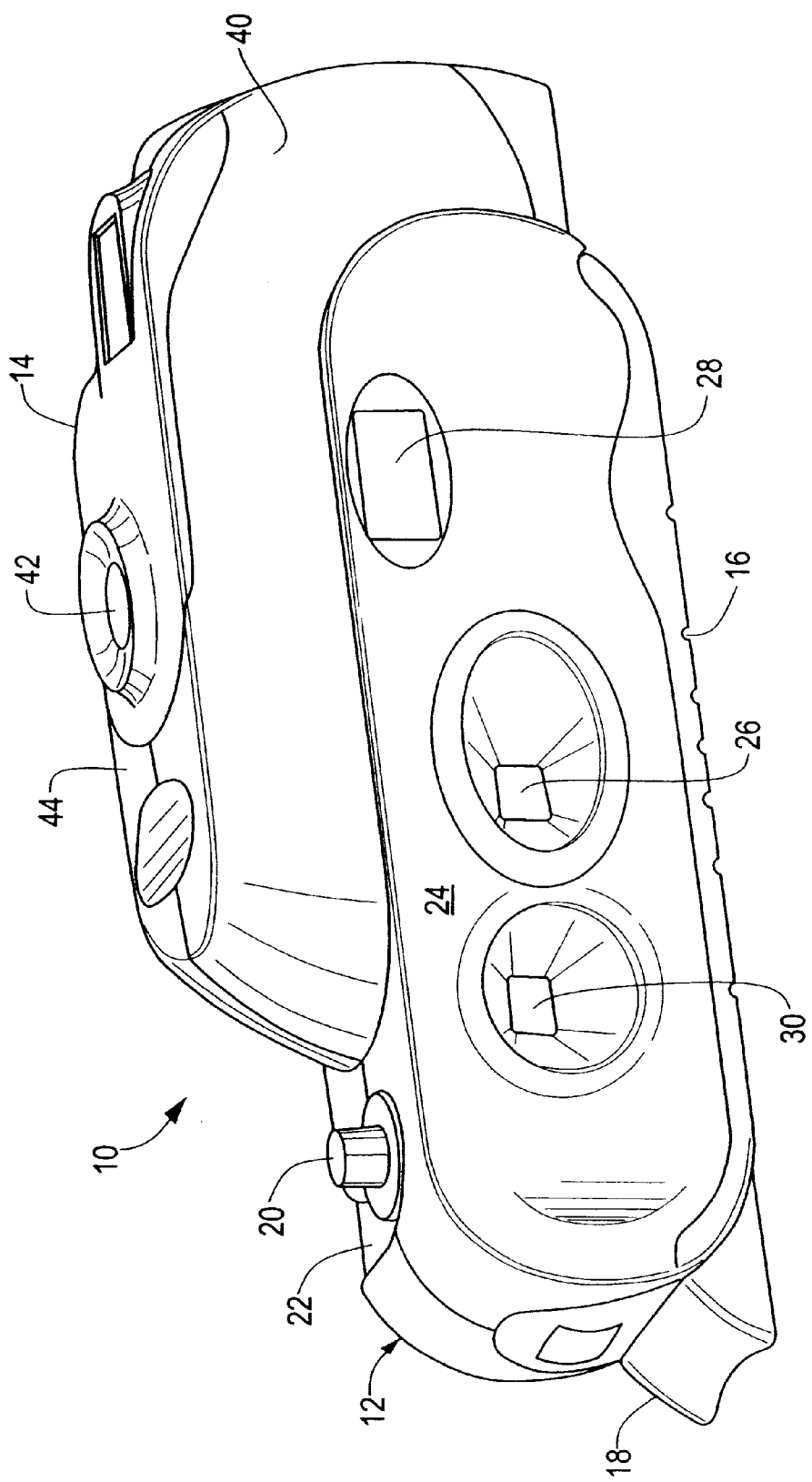
FIG. 1 is a front perspective view of one preferred embodiment of a combination imaging apparatus of the present invention.
Figure 2:
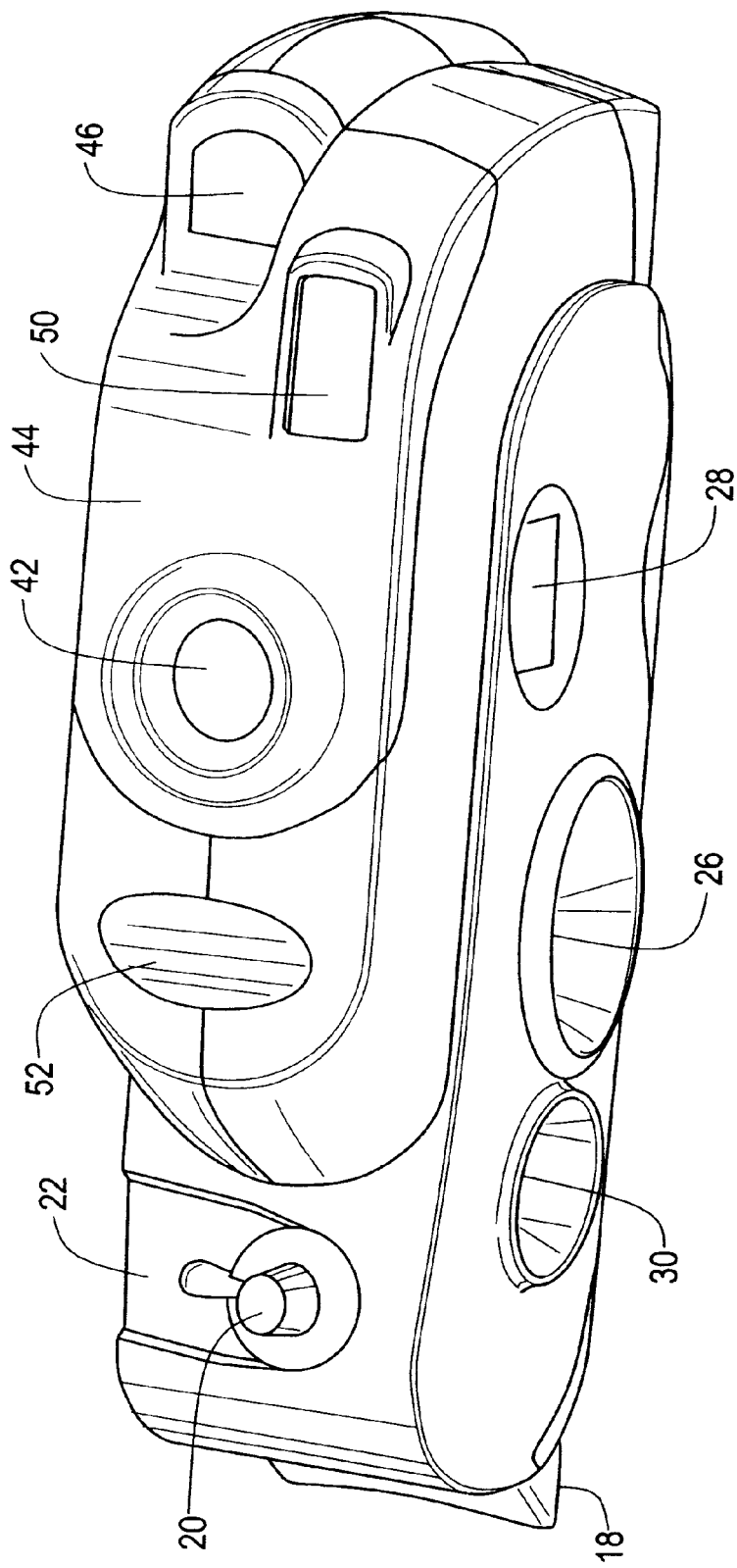
FIG. 2 is a top perspective view of the apparatus of FIG. 1.
Figure 3:
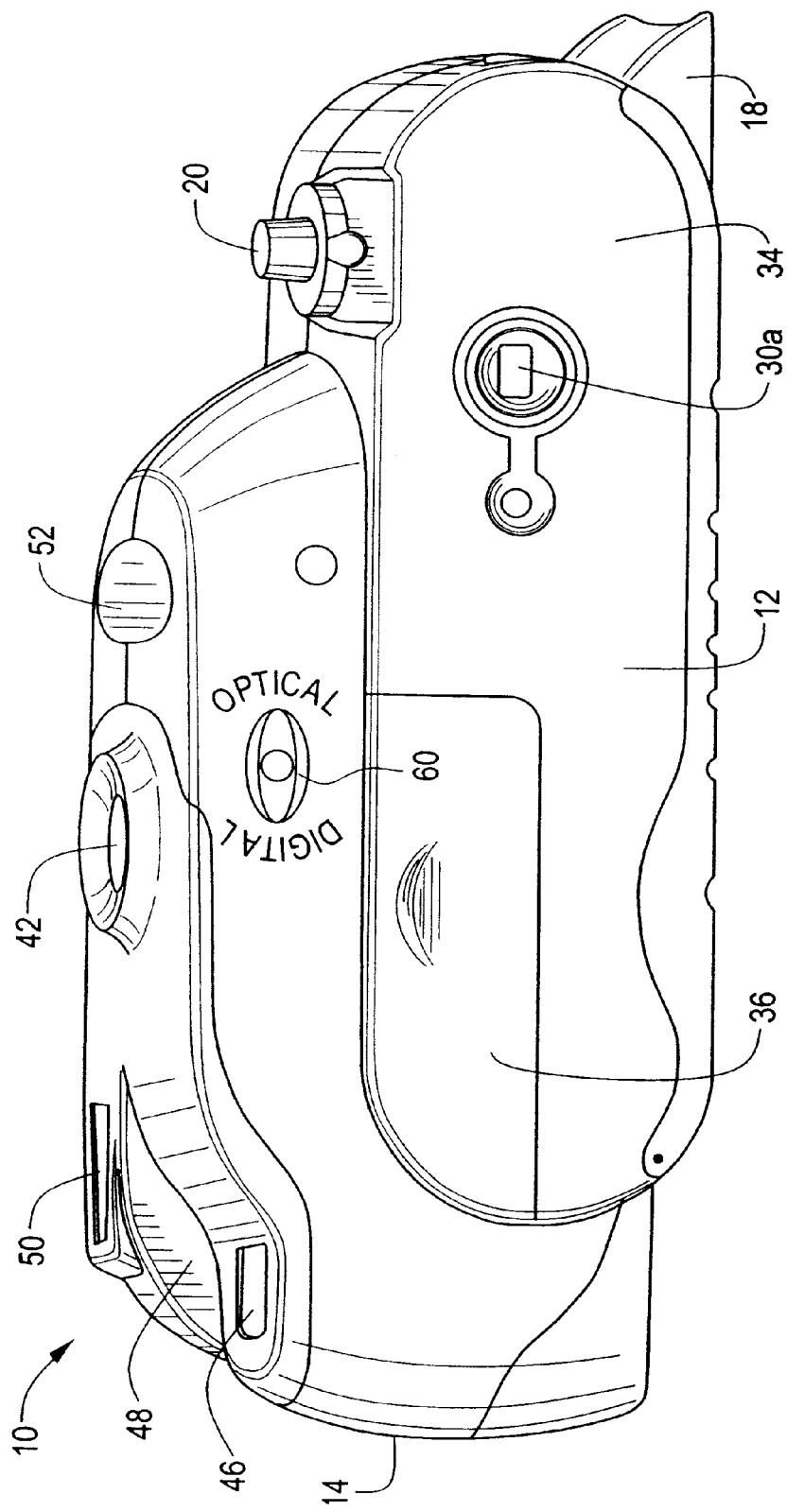
FIG. 3 is a rear perspective view of the imaging apparatus of the present invention; and, FIG. 4 is a perspective view of the imaging apparatus in another image capturing orientation.

Reference is made to FIGS. 1–4 for illustrating one embodiment of an improved dual imaging apparatus 10 of the present invention. In this regard, the imaging apparatus 10 comprises an instant self-developing camera 12 and an electronic camera 14. The self-developing camera 12 is of a type that is commercially available from Polaroid Corporation, Cambridge, Mass. The electronic camera can be of any known type. Essentially, the camera 12 includes an elongated housing 16 having a film exit flap 18 covering a film exit slot (not shown). The camera 12 is of the type that allows a self-developing film (not shown) to exit in response to an operator pulling it from the slot following an exposure. Reference is made to U.S. Pat. No. 5,838,999 for describing a multiple camera system employing such a film. Since the film does not, per se, form an aspect of the present invention, a description thereof is not believed necessary. However, the description thereof in the last noted patent is incorporated herein and made a part hereof. A shutter initiation button 20 extends upwardly from the top wall 22 of the housing and is adapted to be depressed in order for an operator to commence an exposure cycle for the self-developing camera.

The front wall 24 of the camera is provided with a taking lens 26 of an optical taking system that allows the scene radiation to be directed to the film for capture thereon. A strobe unit 28 and a viewfinder lens 30 of a viewfinder lens system 32 are mounted in relationship to the front wall as shown adjacent the taking lens 26. The rear wall 34 includes viewfinder lens 30a and a battery compartment cover 36 for batteries (not shown). It will be appreciated that in order to initiate an exposure of the self-developing camera 12, a user frames the scene image using the viewfinder and presses the shutter button 20 for commencing an exposure interval during which time the strobe unit 28 is fired. Following exposure the film (not shown) is manually withdrawn from the camera thereby initiating processing of a self-developing film unit. It will be appreciated that the self-developing camera 12 can be a conventional type using 35 mm or APS cameras instead of a self-developing camera. It will be appreciated that the camera 12 is normally held in a horizontal orientation for photographic purposes.

Figure 4:
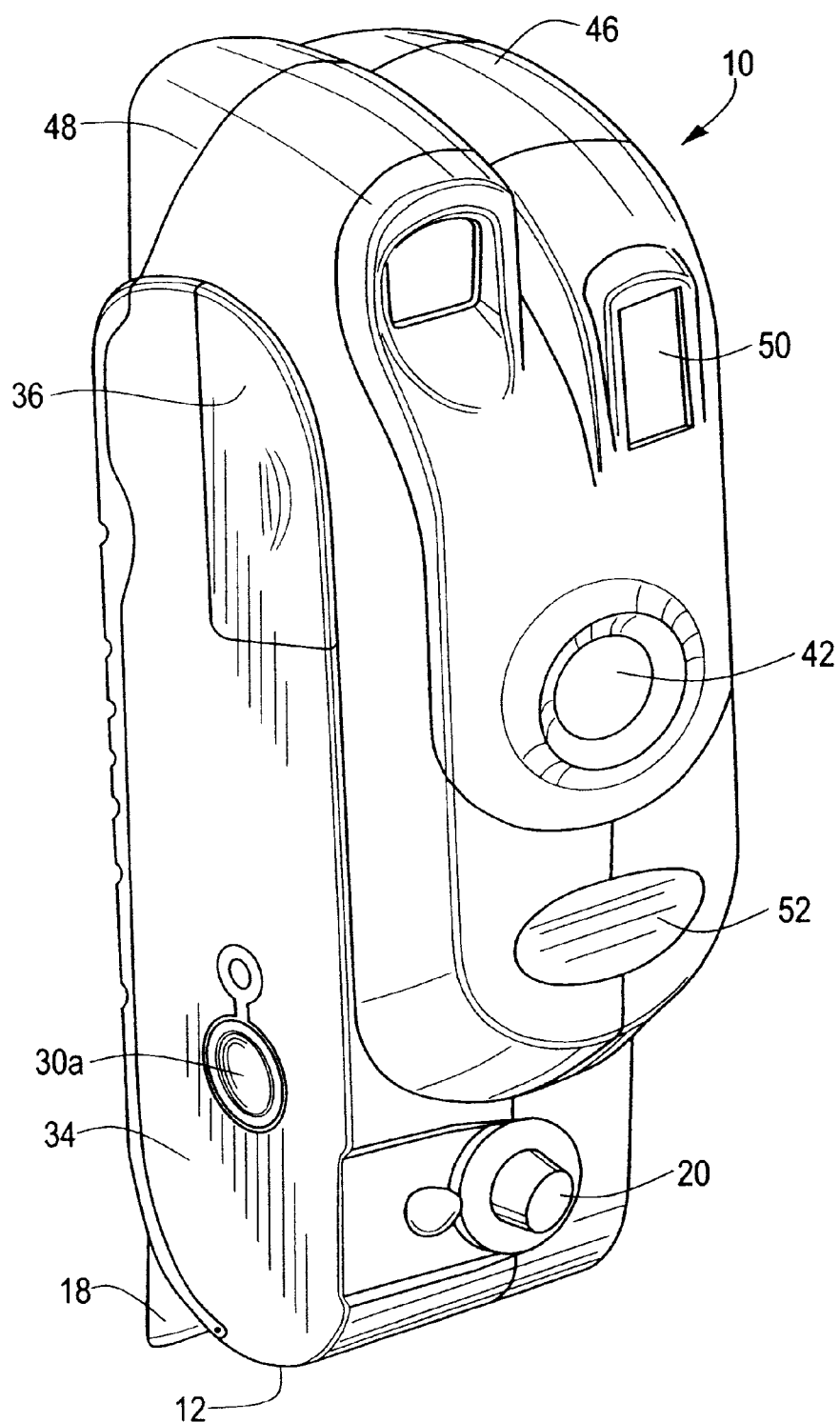

Reference is now made to the electronic imaging camera 14 component of the combination dual imaging apparatus 10. Included is a housing assembly 40 that has its longitudinal axis extending generally parallel to that of the camera housing 16. The housing assembly 40 is securely mounted or formed on the camera housing 16 in the orientation depicted; whereby its longitudinal axis is parallel to that of the top wall of the camera housing 22. Included in the electronic camera 14 is a taking lens 42 situated intermediate the length of the electronic camera housing top wall 44 and having its optical axis generally perpendicular to the top wall and orthogonal to the optical axis of the taking lens 26 of the camera 12. The taking lens 42 directs the images to a suitable digital image sensor module, not shown and not forming a part of the present invention. Adjacent one longitudinal end of the housing assembly 40 and presented in the electronic camera housing top wall 44 thereof is one viewfinder lens 46 of a viewfinder system 48. The lens 46 is recessed in the housing 40 with respect to an electronic strobe 50 of the electronic camera. An exposure initiation button 52 is provided at an opposite end of the top wall 44 on the opposite side of the taking lens 42. It will be appreciated that the strobe 50 is operated during the exposure interval of the electronic camera. In order to use the electronic camera 14 in an ergonomic manner, the foregoing construction requires a user to hold the camera 10 in a vertical orientation with respect to the scene to be imaged, such as indicated in FIG. 4. In that vertical orientation mode, the user frames the subject to be imaged through the viewfinder and presses the exposure button 52 for digitally capturing the scene image. It will be appreciated because of the construction of the present invention, the user need merely rotate the camera 10 in his/her hands so that respective ones of the viewfinders of each camera 12 or 14 is presentable to the user, thereby allowing the user to easily and without resort to complicated control mechanisms make the change from one camera system to the other.

In another embodiment, the housing assembly 40 may have its longitudinal axis extending in other directions that are not parallel to that of the camera housing 16. For example, the housing assembly 40 may be mounted to the rear wall 34, or the housing assembly may be mounted on an angle partially on the top wall 22 and partially on the rear wall 34. Included in the electronic camera 14 is a taking lens 42 situated intermediate the length of the electronic camera housing top wall 44. In this alternative embodiment, the taking lens 42 may be mounted on an angle so that its optical axis is not generally perpendicular to the top wall and orthogonal to the optical axis of the taking lens 26 of the camera 12. The taking lens and housing assembly may be aligned in many different positions relative to the optical axis of the taking lens 26 of the camera 12, in any case, the viewing zone of the digital camera and the film camera will not be the same. The two cameras have different viewing zones because their optical axes are not parallel. In one embodiment, the two cameras optical axes may be generally orthogonal and in other embodiments they will be at various angles to one another. The two cameras having different viewing zones makes it easy, even for children, to understand how to distinguish, position and operate each separate camera.

Instead of each camera having its own battery source, it is contemplated that batteries (not shown) in the battery compartment are connected to the circuit boards (not shown) of both cameras. A known type of manual switch 60 is provided enable user selection of the power for the instant camera 12 or the electronic camera. The present invention also contemplates that the electronic housing 44 can have serial or USB ports (not shown) formed thereon to allow for connection with a PC.

The present invention contemplates that the surfaces of the different housings of each camera can be differentiated visually so that a user can immediately identify which one of the cameras is to be used by this visual distinction. The present invention envisions that the surface treatment of one camera could be different as with the use of visually observable patterns, paint, shading, indicia, or symbols of any kind.

Although now shown, the present invention contemplates that any two different types of cameras, such as noted above can be used within the context of the present invention. Even two different models of the same type of camera can be constructed in the manner noted above to provide the user with an indication which one of the different camera systems is being used.

It is evident from the foregoing that the present invention provides for an improved imaging apparatus wherein multiple independent cameras are integrated into a common unit. Such common unit allows the user to easily flip or reorient the camera while it is being held to effect a change in which one of the cameras is to be used, wherein each is actuated independently of the others and each is constructed to readily facilitate selecting the desired one of the camera systems with a minimal likelihood of error in doing so. Consequently, the camera user is able to readily distinguish which camera is to be used for different circumstances without the need for expensive and sometimes confusing control mechanisms. This is highly advantageous when dealing with less sophisticated photographers.

Since changes may be made in the above structure and process without departing from the scope of the invention described herein, it is intended that all matter contained in the above description or shown in the accompanying drawings shall be interpreted in an illustrative and not in a limiting sense. Thus, other alternatives and modifications will now become apparent without departing from the spirit and scope of the invention.

What is claimed is:

1. An imaging apparatus having a housing that encloses, in a common cavity thereof, an arrangement comprising a pair of independent cameras constructed in combination with each other, said pair of cameras being a digital camera and a photosensitive film camera, wherein the optical axis of the taking system of said digital camera is positioned relative to the optical axis of the taking system of said photosensitive film camera such that the viewing zones of the two cameras do not overlap, and wherein said digital camera and said photosensitive film camera each have their own flash system.

2. The imaging apparatus of claim 1 wherein the optical axis of the taking system of said digital camera is generally orthogonal to the optical axis of the taking system of said photosensitive film camera.

3. The imaging apparatus of claim 1 wherein said photosensitive film camera is an instant self-developing camera.

4. The imaging apparatus of claim 1 wherein said photosensitive film camera is a 35 mm or APS camera.

5. The imaging apparatus of claim 1 wherein a common power source is shared between said digital camera and said photosensitive film camera.

6. The imaging apparatus of claim 5 wherein a manual switch is also provided to enable user selection of power to either said digital camera or to said photosensitive film camera.

7. The imaging system of claim 1 wherein said digital camera and said photosensitive film camera each have their own exposure control initiation button.

8. An imaging apparatus having a housing that encloses, in a common cavity thereof, an arrangement comprising a pair of independent cameras constructed in combination with each other, said pair of cameras being a digital camera and a self processable photosensitive film camera.

* * * * *